(12) United States Patent
Okada et al.

(10) Patent No.: US 10,838,044 B2
(45) Date of Patent: Nov. 17, 2020

(54) ELECTROMAGNETIC WAVE DETECTION APPARATUS AND INFORMATION ACQUISITION SYSTEM

(71) Applicant: KYOCERA Corporation, Kyoto (JP)

(72) Inventors: Hiroki Okada, Machida (JP); Eri Uchida, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/615,102

(22) PCT Filed: May 16, 2018

(86) PCT No.: PCT/JP2018/018954
§ 371 (c)(1),
(2) Date: Nov. 19, 2019

(87) PCT Pub. No.: WO2018/216573
PCT Pub. Date: Nov. 29, 2018

(65) Prior Publication Data
US 2020/0174101 A1 Jun. 4, 2020

(30) Foreign Application Priority Data

May 25, 2017 (JP) ................. 2017-103942

(51) Int. Cl.
*G01C 3/08* (2006.01)
*G01S 7/481* (2006.01)
*G01S 17/06* (2006.01)
*G02B 26/08* (2006.01)

(52) U.S. Cl.
CPC ............ *G01S 7/4816* (2013.01); *G01S 17/06* (2013.01); *G02B 26/0833* (2013.01)

(58) Field of Classification Search
CPC .... G01S 7/4816; G01S 17/06; G02B 26/0833
USPC ......................................... 356/4.01
See application file for complete search history.

(56) References Cited

U.S. PATENT DOCUMENTS

| 9,557,856 B2* | 1/2017 | Send ................. G01J 1/0437 |
| 9,689,667 B2 | 6/2017 | Royo Royo et al. |
| 10,012,532 B2* | 7/2018 | Send ................... G01S 17/04 |
| 2014/0049783 A1 | 2/2014 | Royo Royo et al. |

(Continued)

FOREIGN PATENT DOCUMENTS

| JP | 2004-014802 A | 1/2004 |
| JP | 2004-163271 A | 6/2004 |

(Continued)

*Primary Examiner* — Mark Hellner

(74) *Attorney, Agent, or Firm* — Studebaker & Brackett PC

(57) ABSTRACT

An electromagnetic wave detection apparatus (10) includes a separation unit (16), a first detector (17), a switch (18), and a second detector (20). The separation unit (16) separates incident electromagnetic waves so that the electromagnetic waves propagate in a first direction (d1) and a second direction (d2). The first detector (17) detects the electromagnetic waves that propagate in the first direction (d1). The switch (18) includes a plurality of switching elements (se). The switching elements (se) are capable of switching the propagation direction of the electromagnetic waves that propagate in the second direction (d2) to a third direction (d3) and a fourth direction (d4). The second detector (20) detects the electromagnetic waves that propagate in the third direction (d3).

20 Claims, 6 Drawing Sheets

(56) References Cited

U.S. PATENT DOCUMENTS

2015/0378023 A1  12/2015  Royo Royo et al.
2017/0357000 A1  12/2017  Bartlett et al.

FOREIGN PATENT DOCUMENTS

| JP | 2008-128792 A | 6/2008 |
| JP | 2011-220732 A | 11/2011 |
| JP | 2014-512525 A | 5/2014 |
| WO | 2016/157593 A1 | 10/2016 |

* cited by examiner

ELECTROMAGNETIC WAVE DETECTION APPARATUS AND INFORMATION ACQUISITION SYSTEM

CROSS-REFERENCE TO RELATED APPLICATION

The present application claims priority to and the benefit of Japanese Patent Application No. 2017-103942 filed May 25, 2017, the entire contents of which are incorporated herein by reference.

TECHNICAL FIELD

The present disclosure relates to an electromagnetic wave detection apparatus and an information acquisition system.

BACKGROUND

In recent years, apparatuses have been developed to acquire information related to the surroundings from the results of detection by a plurality of detectors that detect electromagnetic waves. For example, an apparatus that uses laser radar to measure the position of an object in an image captured by an infrared camera is known, as in patent literature (PTL) 1.

CITATION LIST

Patent Literature

PTL 1: JP2011-220732A

SUMMARY

An electromagnetic wave detection apparatus according to a first embodiment includes:

a separation unit configured to separate electromagnetic waves incident on the separation unit so that the electromagnetic waves propagate in a first direction and a second direction;

a first detector configured to detect the electromagnetic waves that propagate in the first direction;

a switch including a plurality of switching elements capable of switching a propagation direction of the electromagnetic waves that propagate in the second direction to a third direction and a fourth direction; and a second detector configured to detect the electromagnetic waves that propagate in the third direction.

An information acquisition system according to an embodiment includes:

an electromagnetic wave detection apparatus comprising a separation unit configured to separate electromagnetic waves incident on the separation unit so that the electromagnetic waves propagate in a first direction and a second direction, a first detector configured to detect the electromagnetic waves that propagate in the first direction, a switch comprising a plurality of switching elements capable of switching a propagation direction of the electromagnetic waves that propagate in the second direction to a third direction and a fourth direction, and a second detector configured to detect the electromagnetic waves that propagate in the third direction; and a controller configured to acquire information related to surroundings of the electromagnetic wave detection apparatus based on an electromagnetic wave detection result by the first detector and the second detector.

DETAILED DESCRIPTION

Embodiments of an electromagnetic wave detection apparatus to which the present disclosure is applied are described below with reference to the drawings. In a configuration for detecting electromagnetic waves with a plurality of detectors that each detect electromagnetic waves, the detection axis of each detector differs. Therefore, even if each detector detects electromagnetic waves in the same region, the coordinate system of the detection results differs between detectors. It would be helpful to reduce the difference between coordinate systems in the detection results of the detectors. It is difficult or impossible, however, to reduce this difference by correction. The electromagnetic wave detection apparatus to which the present disclosure is applied reduces the difference between coordinate systems in the detection results of detectors by being configured to reduce the difference between the detection axes of the detectors.

Figure 1:
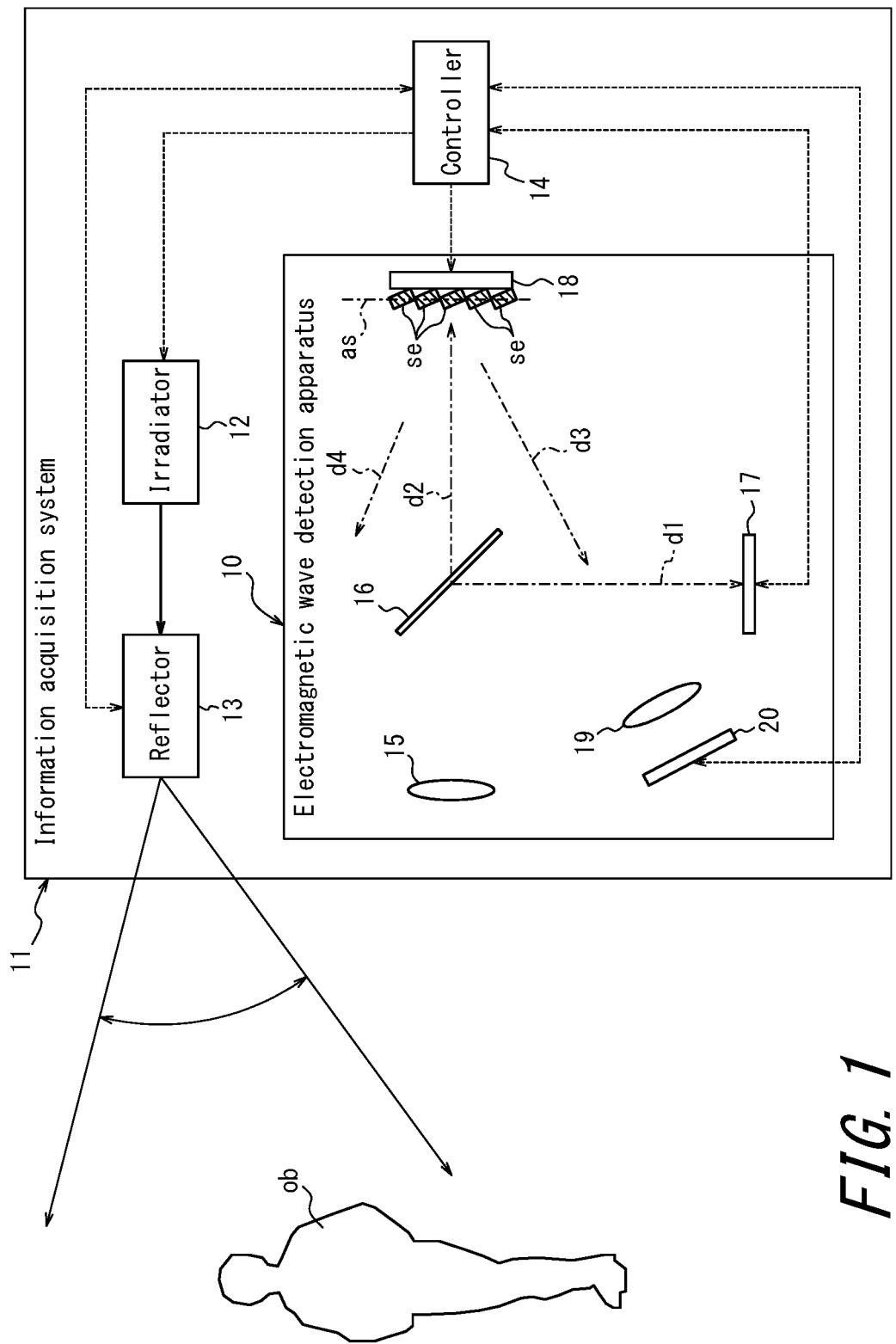
FIG. 1 is a configuration diagram schematically illustrating an information acquisition system that includes an electromagnetic wave detection apparatus according to a first embodiment.

As illustrated in FIG. 1, an information acquisition system 11 that includes an electromagnetic wave detection apparatus 10 according to a first embodiment of the present disclosure is configured to include the electromagnetic wave detection apparatus 10, an irradiator 12, a reflector 13, and a controller 14.

In the drawings described below, the dashed lines connecting functional blocks indicate the flow of control signals or communicated information. The communication represented by the dashed lines may be wired communication or wireless communication. The solid lines projecting from each functional block indicate beams of electromagnetic waves.

The electromagnetic wave detection apparatus 10 includes a pre-stage optical system 15, a separation unit 16, a first detector 17, a switch 18, a first post-stage optical system 19, and a second detector 20.

The pre-stage optical system 15 includes either or both of a lens and a mirror, for example, and forms an image of an object ob that becomes a subject of imaging.

The separation unit 16 is provided between the pre-stage optical system 15 and a primary image formation position, which is the position where the image of the object ob located at a predetermined position separate from the pre-stage optical system 15 is formed by the pre-stage optical system 15. The separation unit 16 separates incident electromagnetic waves so that the electromagnetic waves propagate in a first direction d1 and a second direction d2.

In the first embodiment, the separation unit 16 reflects a portion of the incident electromagnetic waves in the first direction d1 and transmits another portion of the electromagnetic waves in the second direction d2. The separation unit 16 may transmit a portion of the incident electromagnetic waves in the first direction d1 and reflect another portion of the electromagnetic waves in the second direction d2. The separation unit 16 may also refract a portion of the incident electromagnetic waves in the first direction d1 and refract another portion of the electromagnetic waves in the second direction d2. The separation unit 16 is, for example, a one-way mirror, a beam splitter, a dichroic mirror, a cold mirror, a hot mirror, a metasurface, a deflection element, a prism, or the like.

The first detector 17 is provided along the path over which electromagnetic waves propagate from the separation unit 16 in the first direction d1. Furthermore, the first detector 17 is provided at or near an image formation position, which is a position in the first direction d1 from the separation unit 16 where the image of the object ob located at a predetermined position separate from the pre-stage optical system 15 is formed by the pre-stage optical system 15. The first detector 17 detects the electromagnetic waves that propagate from the separation unit 16 in the first direction d1.

The first detector 17 may be disposed with respect to the separation unit 16 so that a first propagation axis of electromagnetic waves propagating from the separation unit 16 in the first direction d1 is parallel to a first detection axis of the first detector 17. The first propagation axis is the central axis of the electromagnetic waves that propagate from the separation unit 16 in the first direction d1 while spreading radially. In the first embodiment, the first propagation axis is bent so that the optical axis of the pre-stage optical system 15 reaches the separation unit 16 and becomes parallel to the first direction d1 at the separation unit 16. The first detection axis passes through the center of the detection surface of the first detector 17 and is perpendicular to the detection surface.

Furthermore, the first detector 17 may be disposed so that the interval between the first propagation axis and the first detection axis is equal to or less than a first interval threshold. The first detector 17 may be disposed so that the first propagation axis and the first detection axis coincide. In the first embodiment, the first detector 17 is disposed so that the first propagation axis and the first detection axis coincide.

The first detector 17 may be disposed relative to the separation unit 16 so that a first angle between the first propagation axis and the detection surface of the first detector 17 is equal to or less than a first angle threshold or is a predetermined angle. In the first embodiment, the first detector 17 is disposed so that the first angle is 90°, as described above.

In the first embodiment, the first detector 17 is a passive sensor. In greater detail, the first detector 17 in the first embodiment includes a device array. For example, the first detector 17 includes an imaging device such as an image sensor or an imaging array, captures the image formed from electromagnetic waves at a detection surface, and generates image information corresponding to the imaged object ob.

In greater detail, the first detector 17 in the first embodiment captures a visible light image. The first detector 17 transmits the generated image information to the controller 14 as a signal.

The first detector 17 may capture an image other than a visible light image, such as an image of infrared rays, ultraviolet rays, or radio waves. The first detector 17 may include a ranging sensor. In this configuration, the electromagnetic wave detection apparatus 10 can acquire distance information in image form with the first detector 17. The first detector 17 may include a ranging sensor thermosensor or the like. In this configuration, the electromagnetic wave detection apparatus 10 can acquire temperature information in image form with the first detector 17.

The switch 18 is provided along the path over which electromagnetic waves propagate from the separation unit 16 in the second direction d2. Furthermore, the switch 18 is provided at or near a primary image formation position, which is a position in the second direction d2 from the separation unit 16 where the image of the object ob located at a predetermined position separate from the pre-stage optical system 15 is formed by the pre-stage optical system 15.

In the first embodiment, the switch 18 is provided at the image formation position. The switch 18 has an action surface as on which electromagnetic waves that pass through the pre-stage optical system 15 and the separation unit 16 are incident. The action surface as is formed by a plurality of switching elements se aligned two-dimensionally. The action surface as is a surface that, in at least one of the first state and the second state described below, produces effects on the electromagnetic waves such as reflection and transmission.

The switch 18 can switch each switching element se between a first state of propagating the electromagnetic waves incident on the action surface as in a third direction d3 and a second state of propagating the electromagnetic waves in a fourth direction d4. In the first embodiment, the first state is a first reflecting state of reflecting the electromagnetic waves incident on the action surface as in the third direction d3. The second state is a second reflecting state of reflecting the electromagnetic waves incident on the action surface as in the fourth direction d4.

In greater detail, the switch 18 of the first embodiment includes a reflecting surface that reflects the electromagnetic waves on each switching element se. The switch 18 switches each switching element se between the first reflecting state and the second reflecting state by changing the orientation of the reflecting surface of each switching element se.

In the first embodiment, the switch 18 includes a digital micro mirror device (DMD), for example. The DMD can drive minute reflecting surfaces that configure the action surface as to switch the reflecting surface on each switching element se between inclined states of +12° and −12° relative to the action surface as. The action surface as is parallel to the board surface of a substrate on which the minute reflecting surfaces are mounted in the DMD.

Figure 2:
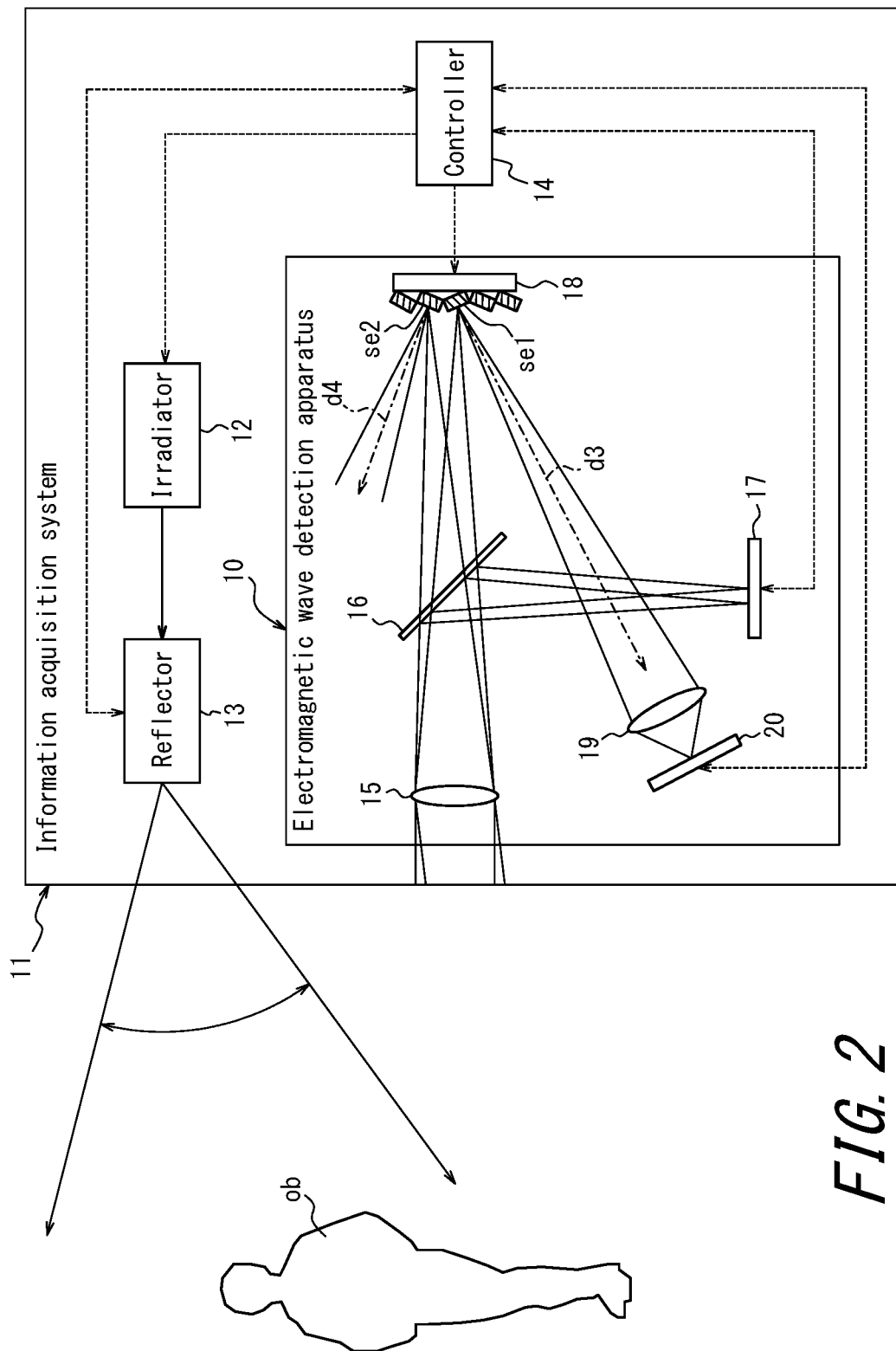
FIG. 2 is a state diagram of the information acquisition system to illustrate the propagation direction of electromagnetic waves in a first state and a second state of switching elements in a switch of the electromagnetic wave detection apparatus of FIG. 1.

The switch 18 switches each switching element se between the first state and the second state based on control by the controller 14, described below. For example, as illustrated in FIG. 2, the switch 18 can simultaneously cause electromagnetic waves incident on a portion of switching elements se1 to propagate in the third direction d3 by switching the switching elements se1 to the first state and cause electromagnetic waves incident on another portion of switching elements se2 to propagate in the fourth direction d4 by switching the switching elements se2 to the second state.

As illustrated in FIG. 1, the first post-stage optical system 19 is provided in the third direction d3 from the switch 18. The first post-stage optical system 19 includes either or both of a lens and a mirror, for example. The first post-stage optical system 19 forms an image of the object ob represented by the electromagnetic waves whose propagation direction is switched at the switch 18.

The second detector 20 is provided along the path of electromagnetic waves that propagate through the first post-stage optical system 19 after propagating in the third direction d3 from the switch 18. The second detector 20 detects electromagnetic waves that pass through the first post-stage optical system 19, i.e. electromagnetic waves that propagate in the third direction d3.

Along with the switch 18, the second detector 20 may be disposed with respect to the separation unit 16 so that a second propagation axis of electromagnetic waves propagating from the separation unit 16 in the second direction d2 and switched in propagation direction to the third direction d3 by the switch 18 is parallel to a second detection axis of the second detector 20. The second propagation axis is the central axis of the electromagnetic waves that propagate from the switch 18 in the third direction d3 while spreading radially. In the first embodiment, the second propagation axis is bent so that the optical axis of the pre-stage optical system 15 reaches the switch 18 and becomes parallel to the third direction d3 at the switch 18. The second detection axis passes through the center of the detection surface of the second detector 20 and is perpendicular to the detection surface.

Along with the switch 18, the second detector 20 may also be disposed so that the interval between the second propagation axis and the second detection axis is equal to or less than a second interval threshold. The second interval threshold may be the same as or different from the first interval threshold. Along with the first detector 17 and the switch 18, the second detector 20 may be disposed so that the interval between the first propagation axis and the first detection axis differs from the interval between the second propagation axis and the second detection axis by a predetermined interval difference or less (for example, the diameter of the detection surfaces of the first detector 17 and the second detector 20). The second detector 20 may be disposed so that the second propagation axis and the second detection axis coincide. In the first embodiment, the second detector 20 is disposed so that the second propagation axis and the second detection axis coincide.

Along with the switch 18, the second detector 20 may be disposed relative to the separation unit 16 so that a second angle between the second propagation axis and the detection surface of the second detector 20 is equal to or less than a second angle threshold or is a predetermined angle. The second angle threshold may be the same as or different from the first angle threshold. Along with the first detector 17 and the switch 18, the second detector 20 may be disposed so that the difference between the first angle and the second angle is equal to or less than a predetermined angle difference (for example, to satisfy the Scheimpflug principle). In the first embodiment, the second detector 20 is disposed so that the second angle is 90°, as described above.

In the first embodiment, the second detector 20 is an active sensor that detects reflected waves, from the object ob, of electromagnetic waves irradiated towards the object ob from the irradiator 12. The second detector 20 in the first embodiment detects reflected waves, from the object ob, of electromagnetic waves irradiated towards the object ob after being irradiated from the irradiator 12 and reflected by the reflector 13. As described below, the electromagnetic waves irradiated from the irradiator 12 are at least one of infrared rays, visible light rays, ultraviolet rays, and radio waves, and the second detector 20 detects the same or a different type of electromagnetic waves as the first detector 17.

In greater detail, the second detector 20 of the first embodiment includes a device configured as a ranging sensor. For example, the second detector 20 includes a single device such as an avalanche photodiode (APD), a photodiode (PD), or a ranging image sensor. The second detector 20 may include a device array, such as an APD array, a PD array, a ranging imaging array, or a ranging image sensor.

The second detector 20 of the first embodiment transmits detection information, indicating the detection of reflected waves from the subject, to the controller 14 as a signal. In greater detail, the second detector 20 detects electromagnetic waves in the infrared light band.

It suffices for the single device configured as the above-described ranging sensor in the second detector 20 to be capable of detecting electromagnetic waves. Image formation at the detection surface is not required. The second detector 20 therefore need not be provided at a secondary image formation position, which is a position of image formation by the first post-stage optical system 19. In other words, as long as electromagnetic waves from all angles of view can be incident on the detection surface, the second detector 20 with this configuration may be disposed at any position along the path of electromagnetic waves that propagate in the third direction d3, due to the switch 18, and subsequently pass through the first post-stage optical system 19.

The irradiator 12 emits at least one of infrared rays, visible light rays, ultraviolet rays, and radio waves. In the first embodiment, the irradiator 12 emits infrared rays. The irradiator 12 irradiates the electromagnetic waves towards the object ob either indirectly via the reflector 13 or directly. In the first embodiment, the irradiator 12 irradiates the electromagnetic waves towards the object ob indirectly via the reflector 13.

In the first embodiment, the irradiator 12 emits a narrow beam, for example 0.5°, of electromagnetic waves. In the first embodiment, the irradiator 12 emits pulses of electromagnetic waves. For example, the irradiator 12 includes a light emitting diode (LED), laser diode (LD), or the like. The irradiator 12 switches between emitting and not emitting electromagnetic waves based on control by the controller 14, described below.

The reflector 13 changes the irradiation position of electromagnetic waves irradiated onto the object ob by reflecting the electromagnetic waves emitted from the irradiator 12 while the orientation of the reflector 13 changes. In other words, the reflector 13 scans the object ob with the electromagnetic waves emitted from the irradiator 12. Accordingly, the second detector 20 in the first embodiment works together with the reflector 13 to form a scanning-type ranging sensor. The reflector 13 scans the object ob one- or two-dimensionally. In the first embodiment, the reflector 13 scans the object ob two-dimensionally.

The reflector 13 is configured so that at least a portion of an irradiation region of the electromagnetic waves that are emitted by the irradiator 12 and reflected is included in an electromagnetic wave detection range of the electromagnetic wave detection apparatus 10. Accordingly, at least a portion of the electromagnetic waves irradiated onto the object ob via the reflector 13 can be detected by the electromagnetic wave detection apparatus 10.

In the first embodiment, the reflector 13 is configured so that at least a portion of the irradiation region of the electromagnetic waves that are emitted by the irradiator 12 and reflected by the reflector 13 is included in the detection range of the second detector 20. Accordingly, in the first embodiment, at least a portion of the electromagnetic waves irradiated onto the object ob via the reflector 13 can be detected by the second detector 20.

The reflector 13 may, for example, include a micro electro mechanical systems (MEMS) mirror, a polygon mirror, a galvano mirror, or the like. In the first embodiment, the reflector 13 includes a MEMS mirror.

Based on control by the controller 14, described below, the reflector 13 changes the direction in which electromagnetic waves are reflected. The reflector 13 may include an angle sensor, such as an encoder, and may notify the controller 14 of the angle detected by the angle sensor as information on the direction in which electromagnetic waves are reflected (direction information). This configuration allows the controller 14 to calculate the irradiation position based on the direction information acquired from the reflector 13. The controller 14 can also calculate the irradiation position based on a drive signal inputted to the reflector 13 to change the direction in which electromagnetic waves are reflected.

The controller 14 includes one or more processors and a memory. The term "processor" encompasses either or both general-purpose processors that execute particular functions by reading particular programs and dedicated processors that are specialized for particular processing. The dedicated processor may include an application specific integrated circuit (ASIC). The processor may include a programmable logic device (PLD). The PLD may include a field-programmable gate array (FPGA). The controller 14 may include either or both of a system-on-a-chip (SoC) that has one processor or a plurality of processors working together and a system-in-a-package (SiP).

The controller 14 acquires information related to the surroundings of the electromagnetic wave detection apparatus 10 based on electromagnetic waves detected by each of the first detector 17 and the second detector 20. The information related to the surroundings may, for example, be image information, distance information, and temperature information. In the first embodiment, the controller 14 acquires image information in the form of electromagnetic waves detected as an image by the first detector 17, as described above. Based on the detection information detected by the second detector 20, the controller 14 in the first embodiment also uses the time-of-flight (TOF) method to acquire distance information of the irradiation position irradiated by the irradiator 12.

Figure 3:
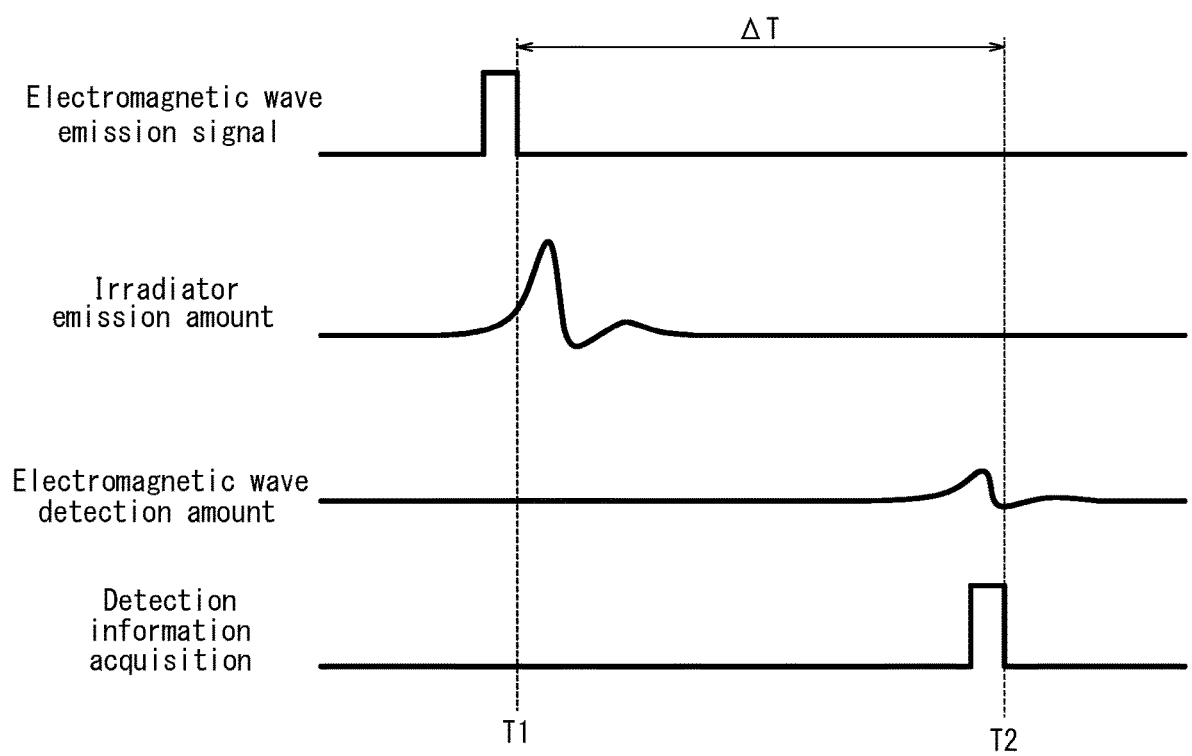
FIG. 3 is a timing chart of the timing of emission and detection of electromagnetic waves to illustrate the principle of ranging by a ranging sensor configured by an irradiator, a second detector, and a controller of FIG. 1.

As illustrated in FIG. 3, the controller 14 causes the irradiator 12 to emit pulses of electromagnetic waves by inputting an electromagnetic wave emission signal to the irradiator 12 (see the "electromagnetic wave emission signal" section). The irradiator 12 irradiates electromagnetic waves based on the inputted electromagnetic wave emission signal (see the "irradiator emission amount" section). The electromagnetic waves emitted by the irradiator 12 and reflected by the reflector 13 to be irradiated on an arbitrary irradiation region are reflected in the irradiation region. The controller 14 switches at least a portion of the switching elements se, in an image formation region in the switch 18 where reflected waves in the irradiation region are formed into an image by the pre-stage optical system 15, to the first state and switches the other switching elements se to the second state. The second detector 20 then notifies the controller 14 of detection information, as described above, when detecting electromagnetic waves reflected in the irradiation region (see the "electromagnetic wave detection amount" section).

The controller 14 may, for example, include a time measurement large scale integrated circuit (LSI) and measure a time $\Delta T$ from a timing T1 at which the controller 14 caused the irradiator 12 to emit electromagnetic waves to a timing T2 at which the controller 14 acquires the detection information (see the "detection information acquisition" section). The controller 14 multiplies the time $\Delta T$ by the speed of light and divides by two to calculate the distance to the irradiation position. As described above, the controller 14 calculates the irradiation position based on the direction information acquired from the reflector 13 or the drive signal that the controller 14 outputs to the reflector 13. By changing the irradiation position while calculating the distance to each irradiation position, the controller 14 creates distance information in image form.

In the first embodiment, the information acquisition system 11 is configured to create distance information by direct ToF, in which the time is measured from when laser light is irradiated until the laser light returns, as described above. The information acquisition system 11 is not, however, limited to this configuration. For example, the information acquisition system 11 may create distance information by flash ToF, in which electromagnetic waves are irradiated with a constant period, and the time until return is measured indirectly from the phase difference between the irradiated electromagnetic waves and the returning electromagnetic waves. The information acquisition system 11 may also create distance information by another ToF method, such as phased ToF.

The electromagnetic wave detection apparatus 10 of the first embodiment with the above configuration separates incident electromagnetic waves so that the electromagnetic waves propagate in the first direction d1 and the second direction d2 and can switch the propagation direction of the electromagnetic waves that propagate in the second direction d2 to the third direction d3. This configuration allows the electromagnetic wave detection apparatus 10 to match the optical axis of the pre-stage optical system 15 to the first propagation axis, which is the central axis of the electromagnetic waves propagated in the first direction d1, and to the second propagation axis, which is the central axis of the electromagnetic waves propagated in the third direction d3. The electromagnetic wave detection apparatus 10 can therefore reduce the misalignment of the optical axes of the first detector 17 and the second detector 20. The electromagnetic wave detection apparatus 10 can thereby reduce the misalignment between the first detection axis and the second detection axis. Hence, the electromagnetic wave detection apparatus 10 can reduce the misalignment of coordinate systems in the detection results of the first detector 17 and the second detector 20. The effects of such a configuration are the same for the electromagnetic wave detection apparatus of the second embodiment, described below.

In the electromagnetic wave detection apparatus 10 of the first embodiment, the first detector 17, the switch 18, and the second detector 20 are disposed relative to the separation unit 16 so that the first propagation axis becomes parallel to the first detection axis, and the second propagation axis becomes parallel to the second detection axis. This configuration allows the electromagnetic wave detection apparatus 10 to reduce the misalignment between the first detection axis and the second detection axis and also achieve a uniform imaging state of electromagnetic waves on the detection surface, regardless of distance from the propagation axis. Accordingly, the electromagnetic wave detection apparatus 10 can obtain information related to the surroundings in a uniform imaging state without performing information processing in the controller 14 to achieve a uniform imaging state. The effects of such a configuration are the same for the electromagnetic wave detection apparatus of the second embodiment, described below.

In the electromagnetic wave detection apparatus 10 of the first embodiment, the first detector 17 is disposed relative to the separation unit 16 so that the interval between the first propagation axis and the first detection axis is equal to or less than the first interval threshold, and the switch 18 and second detector 20 are disposed relative to the separation unit 16 so that the interval between the second propagation axis and the second detection axis is equal to or less than the second interval threshold. This configuration allows the electromagnetic wave detection apparatus 10 to reduce the misalignment between the first detection axis and the second detection axis further. The effects of such a configuration are the same for the electromagnetic wave detection apparatus of the second embodiment, described below.

In the electromagnetic wave detection apparatus 10 of the first embodiment, the first detector 17, the switch 18, and the second detector 20 are disposed relative to the separation unit 16 so that the interval between the first propagation axis and the first detection axis differs from the interval between the second propagation axis and the second detection axis by a predetermined interval difference or less. This configuration allows the electromagnetic wave detection apparatus 10 to reduce the misalignment between the first detection axis and the second detection axis even further. The effects of such a configuration are the same for the electromagnetic wave detection apparatus of the second embodiment, described below.

In the electromagnetic wave detection apparatus 10 of the first embodiment, the first detector 17, the switch 18, and the second detector 20 are disposed relative to the separation unit 16 so that the first propagation axis coincides with the first detection axis, and the second propagation axis coincides with the second detection axis. This configuration allows the electromagnetic wave detection apparatus 10 to reduce the misalignment between the first detection axis and the second detection axis even further still. The effects of such a configuration are the same for the electromagnetic wave detection apparatus of the second embodiment, described below.

In the electromagnetic wave detection apparatus 10 of the first embodiment, the first detector 17, the switch 18, and the second detector 20 are disposed relative to the separation unit 16 so that the first angle is equal to or less than the first angle threshold or is a predetermined angle, and so that the second angle is equal to or less than the second angle threshold or is a predetermined angle. This configuration allows the electromagnetic wave detection apparatus 10 to reduce the misalignment between the first detection axis and the second detection axis and also reduce the unevenness, corresponding to the distance from the propagation axis, of the imaging state of electromagnetic waves on the detection surface. Accordingly, the electromagnetic wave detection apparatus 10 can reduce the burden on the controller 14 for information processing to achieve a uniform imaging state. The effects of such a configuration are the same for the electromagnetic wave detection apparatus of the second embodiment, described below.

In the electromagnetic wave detection apparatus 10 of the first embodiment, the first detector 17, the switch 18, and the second detector 20 are disposed relative to the separation unit 16 so that the difference between the first angle and the second angle is equal to or less than a predetermined angle difference. This configuration allows the electromagnetic wave detection apparatus 10 to reduce the misalignment between the optical axes of the first detector 17 and the second detector 20 even further. The effects of such a configuration are the same for the electromagnetic wave detection apparatus of the second embodiment, described below.

The electromagnetic wave detection apparatus 10 of the first embodiment can switch a portion of the switching elements se in the switch 18 to the first state and switch another portion of the switching elements se to the second state. This configuration allows the electromagnetic wave detection apparatus 10 to detect, using the second detector 20, information based on the electromagnetic waves at each portion of the object ob that emits the electromagnetic waves incident on the switching elements se. The effects of such a configuration are the same for the electromagnetic wave detection apparatus of the second embodiment, described below.

Next, an electromagnetic wave detection apparatus according to a second embodiment of the present disclosure is described. The second embodiment differs from the first embodiment by further including a third detector. The second embodiment is described below, focusing on the differences from the first embodiment. The same reference signs are used for components with the same configuration as in the first embodiment.

Figure 4:
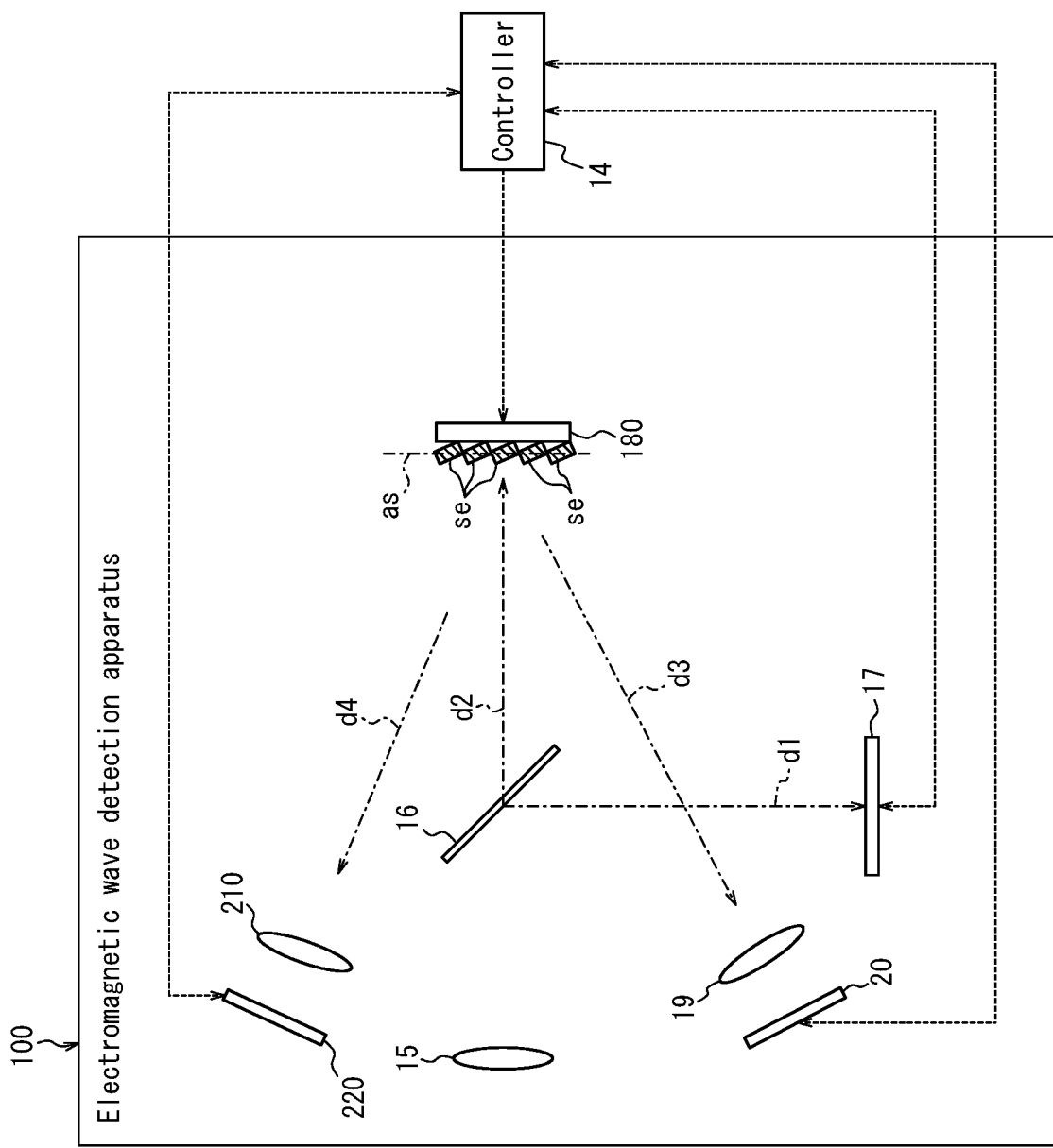
FIG. 4 is a configuration diagram schematically illustrating an electromagnetic wave detection apparatus according to a second embodiment.

As illustrated in FIG. 4, an electromagnetic wave detection apparatus 100 according to the second embodiment includes a pre-stage optical system 15, a separation unit 16, a first detector 17, a switch 180, a first post-stage optical system 19, a second post-stage optical system 210, a second detector 20, and a third detector 220. The configuration of the information acquisition system 11 according to the second embodiment other than the electromagnetic wave detection apparatus 100 is the same as in the first embodiment. The configuration and functions of the pre-stage optical system 15, the separation unit 16, the first detector 17, the first post-stage optical system 19, and the second detector 20 in the second embodiment are the same as in the first embodiment.

The arrangement of the switch 180 in the electromagnetic wave detection apparatus 100 is the same as in the first embodiment. Like the first embodiment, the switch 180 includes an action surface as formed by a plurality of switching elements se aligned two-dimensionally. Unlike the first embodiment, the switch 180 can switch each switching element se not only to a first state of propagating the electromagnetic waves incident on the action surface as in a third direction d3 and a second state of propagating the electromagnetic waves in a fourth direction d4, but also to a third state of propagating the electromagnetic waves in a direction other than the third direction d3 and the fourth direction d4.

In the second embodiment, the first state is a first reflecting state of reflecting the electromagnetic waves incident on the action surface as in the third direction d3. The second state is a second reflecting state of reflecting the electromagnetic waves incident on the action surface as in the fourth direction d4. The third state is a third reflecting state of reflecting the electromagnetic waves incident on the action surface as in a direction other than the third direction d3 and the fourth direction d4.

In greater detail, the switch 180 of the second embodiment includes a reflecting surface that reflects the electromagnetic waves on each switching element se. The switch 180 switches each switching element se among the first reflecting state, the second reflecting state, and the third reflecting state by changing the orientation of the reflecting surface of each switching element se.

In the second embodiment, the switch 180 includes a digital micro mirror device (DMD), for example. The DMD can drive minute reflecting surfaces that configure the action surface as to switch the reflecting surface on each switching element se between inclined states of +12° and −12° relative to the action surface as. Furthermore, by suspending driving of the reflecting surface, the DMD can switch the reflecting surface of each switching element se to an inclined state of approximately 0° relative to the action surface as.

Figure 5:
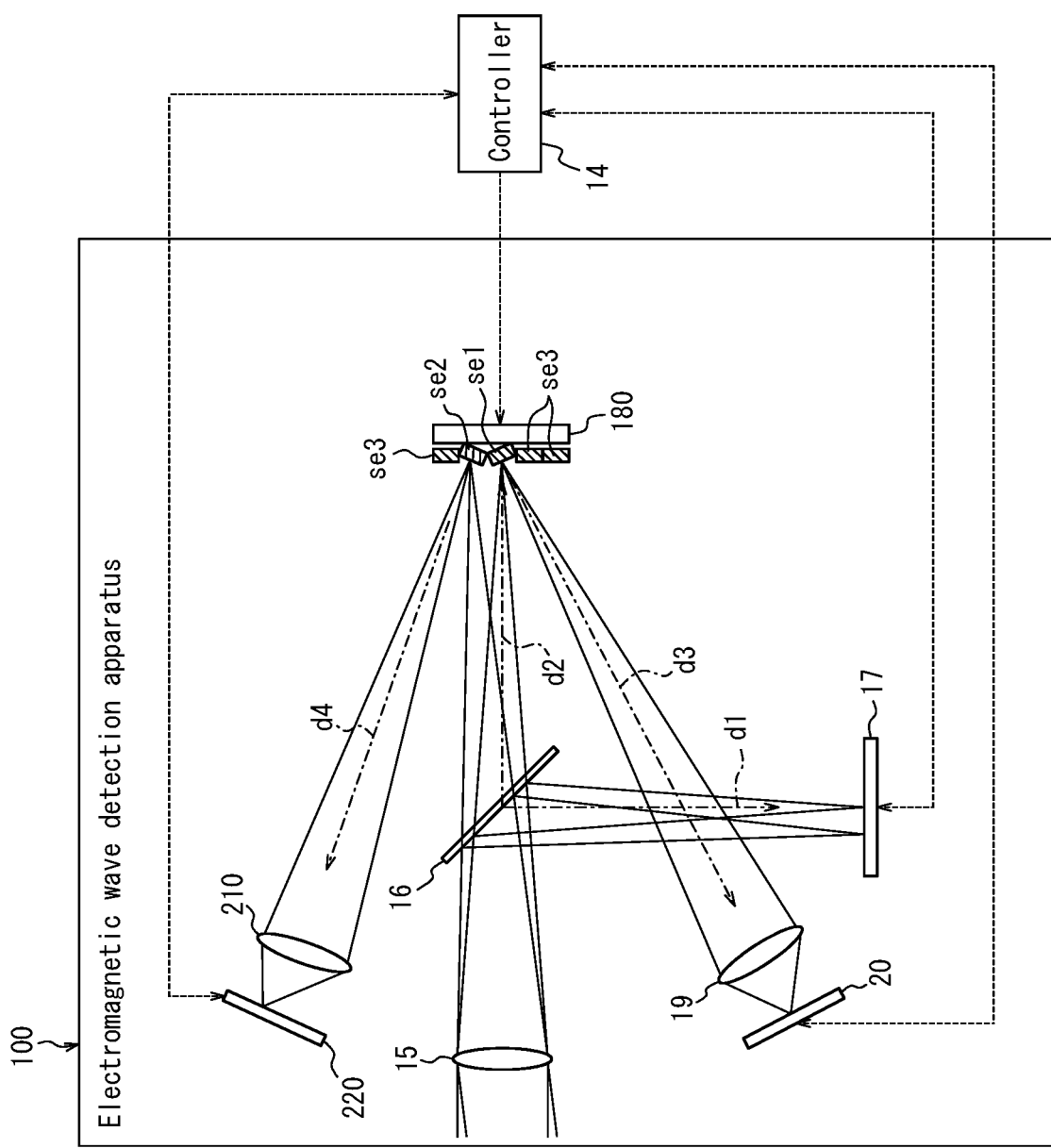
FIG. 5 is a state diagram of the electromagnetic wave detection apparatus to illustrate the state of switching, by switching element, the propagation direction of electromagnetic waves in the second embodiment.

The switch 180 switches each switching element se among the first state, the second state, and the third state based on control by the controller 14. For example, as illustrated in FIG. 5, the switch 180 can simultaneously switch a portion of the switching elements se1 to the first state, another portion of the switching elements se2 to the second state, and the remaining switching elements se3 to the third state to propagate the electromagnetic waves incident on the switching elements se1 in the third direction d3, the electromagnetic waves incident on the switching elements se2 in the fourth direction d4, and the electromagnetic waves incident on the switching elements se3 in a direction other than the third direction d3 and the fourth direction d4.

The second post-stage optical system 210 is provided in the fourth direction d4 from the switch 180. The second post-stage optical system 210 includes either or both of a lens and a mirror, for example. The second post-stage optical system 210 forms an image of the object ob represented by the electromagnetic waves whose propagation direction is switched at the switch 180.

The third detector 220 is provided along the path of electromagnetic waves that propagate through the second post-stage optical system 210 after propagating in the fourth direction d4 from the switch 180. The third detector 220 detects electromagnetic waves that pass through the second post-stage optical system 210, i.e. electromagnetic waves that propagate in the fourth direction d4.

Along with the switch 180, the third detector 220 may disposed with respect to the separation unit 16 so that a third propagation axis of electromagnetic waves propagating from the separation unit 16 in the second direction d2 and switched in propagation direction to the fourth direction d4 by the switch 180 is parallel to a third detection axis of the third detector 220. The third propagation axis is the central axis of the electromagnetic waves that propagate from the switch 180 in the fourth direction d4 while spreading radially. In the second embodiment, the third propagation axis is bent so that the optical axis of the pre-stage optical system 15 reaches the switch 180 and becomes parallel to the fourth direction d4 at the switch 180. The third detection axis passes through the center of the detection surface of the third detector 220 and is perpendicular to the detection surface.

Along with the switch 180, the third detector 220 may also be disposed so that the interval between the third propagation axis and the third detection axis is equal to or less than a third interval threshold. The third interval threshold may be the same as or different from the first interval threshold the second interval threshold. Along with the first detector 17, the switch 180, and the second detector 20, the third detector 220 may be disposed so that the interval between the first propagation axis and the first detection axis and the interval between the second propagation axis and the second detection axis differ from the interval between the third propagation axis and the third detection axis by a predetermined interval difference or less. The third detector 220 may be disposed so that the third propagation axis and the third detection axis coincide. In the second embodiment, the third detector 220 is disposed so that the third propagation axis and the third detection axis coincide.

Along with the switch 180, the third detector 220 may be disposed relative to the separation unit 16 so that a third angle between the third propagation axis and a perpendicular to the detection surface of the third detector 220 is equal to or less than a third angle threshold or a predetermined angle. The third angle threshold may be the same as or different from the first angle threshold or the second angle threshold. Along with the first detector 17, and the switch 180, and the second detector 20, the third detector 220 may be disposed so that the first angle and the second angle differ from the third angle by a predetermined angle difference or less. In the second embodiment, the third detector 220 is disposed so that the third angle as described above is 90°.

In the second embodiment, the third detector 220 is an active sensor that detects reflected waves, from the object ob, of electromagnetic waves irradiated towards the object ob from the irradiator 12. The third detector 220 in the second embodiment detects reflected waves, from the object ob, of electromagnetic waves irradiated towards the object ob after being irradiated from the irradiator 12 and reflected by the reflector 13. As described above, the electromagnetic waves irradiated from the irradiator 12 are at least one of infrared light rays, visible light rays, ultraviolet rays, and radio waves, and the third detector 220 detects the same or a different type of electromagnetic waves as the first detector 17 and the same type of electromagnetic wave as the second detector 20.

In greater detail, the third detector 220 of the second embodiment includes a device configured as a ranging sensor. For example, the third detector 220 includes a single device such as an avalanche photodiode (APD), a photodiode (PD), a single photon avalanche diode (SPAD), a multi-pixel photon counter (MPPC), or a ranging image sensor. The third detector 220 may include a device array, such as a SPAD array, an APD array, a PD array, a ranging imaging array, or a ranging image sensor.

The third detector 220 of the second embodiment transmits detection information, indicating the detection of reflected waves from the subject, to the controller 14 as a signal. In greater detail, the third detector 220 detects electromagnetic waves in the infrared light band.

It suffices for the single device configured as the above-described ranging sensor in the third detector 220 to be capable of detecting electromagnetic waves. Image formation at the detection surface is not required. The third detector 220 therefore need not be provided at a secondary image formation position, which is a position of image formation by the second post-stage optical system 210. In other words, as long as electromagnetic waves from all angles of view can be incident on the detection surface, the third detector 220 with this configuration may be disposed at any position along the path of electromagnetic waves that propagate in the fourth direction d4, due to the switch 180, and subsequently pass through the second post-stage optical system 210.

In the second embodiment, unlike the first embodiment, the controller 14 switches at least a portion of the switching elements se, in an image formation region in the switch 180 where reflected waves from the irradiation region of electromagnetic waves are formed into an image by the pre-stage optical system 15, to the first state, switches another portion of the switching elements se to the second state, and switches the remaining switching elements se to the third state.

In this way, the electromagnetic wave detection apparatus 100 of the second embodiment includes the third detector 220 that detects electromagnetic waves propagated in the fourth direction d4 from the switch 180. This configuration allows the electromagnetic wave detection apparatus 100 to match the optical axis of the pre-stage optical system 15 to the first propagation axis, which is the central axis of the electromagnetic waves propagated in the first direction d1, to the second propagation axis, which is the central axis of the electromagnetic waves propagated in the third direction d3, and to the third propagation axis, which is the central axis of the electromagnetic waves propagated in the fourth direction d4. The electromagnetic wave detection apparatus 100 can therefore reduce the misalignment of the optical axes of the first detector 17, the second detector 20, and the third detector 220. The electromagnetic wave detection apparatus 100 can thereby reduce the misalignment between the first detection axis, the second detection axis, and the third detection axis. Hence, the electromagnetic wave detection apparatus 100 can reduce the misalignment of coordinate systems in the detection results of the first detector 17, the second detector 20, and the third detector 220.

The electromagnetic wave detection apparatus 100 of the second embodiment can switch a portion of the switching elements se in the switch 180 to the first state and switch another portion of the switching elements se to the second state. This configuration allows the electromagnetic wave detection apparatus 100 to cause a portion of the switching elements se to propagate electromagnetic waves towards the second detector 20 while causing another portion of the switching elements se to propagate electromagnetic waves towards the third detector 220. The electromagnetic wave detection apparatus 100 can therefore simultaneously acquire information relating to different regions. In this way, the electromagnetic wave detection apparatus 100 can shorten the time necessary for acquiring distance information in image form, for example.

In the electromagnetic wave detection apparatus 100 of the second embodiment, the third detector 220 is disposed, along with the switch 180, relative to the separation unit 16 so that the third propagation axis becomes parallel to the third detection axis. This configuration allows the electromagnetic wave detection apparatus 100 to reduce the misalignment between the first detection axis, the second detection axis, and the third detection axis and also achieve a uniform imaging state of electromagnetic waves on the detection surface of the third detector 220, regardless of distance from the third propagation axis. Accordingly, the electromagnetic wave detection apparatus 100 can obtain information related to the surroundings in a uniform imaging state without performing information processing in the controller 14 to achieve a uniform imaging state.

In the electromagnetic wave detection apparatus 100 of the second embodiment, the third detector 220 is disposed, along with the switch 180, relative to the separation unit 16 so that the interval between the third propagation axis and the third detection axis is equal to or less than the third interval threshold. This configuration allows the electromagnetic wave detection apparatus 100 to reduce the misalignment of the third detection axis relative to the first detection axis or the second detection axis further.

In the electromagnetic wave detection apparatus 100 of the second embodiment, the first detector 17, the switch 180, the second detector 20, and the third detector 220 are disposed relative to the separation unit 16 so that the interval between the third propagation axis and the third detection axis differs from the interval between the first propagation axis and the first detection axis and the interval between the second propagation axis and the second detection axis by a predetermined interval difference or less. This configuration allows the electromagnetic wave detection apparatus 100 to reduce the misalignment of the third detection axis relative to the first detection axis and the second detection axis even further.

In the electromagnetic wave detection apparatus 100 of the second embodiment, the third detector 220, along with the switch 180, is disposed relative to the separation unit 16 so that the third propagation axis coincides with the third detection axis. This configuration allows the electromagnetic wave detection apparatus 100 to reduce the misalignment of the third detection axis relative to the first detection axis and the second detection axis even further still.

In the electromagnetic wave detection apparatus 100 of the second embodiment, the third detector 220, along with the switch 180, is disposed relative to the separation unit 16 so that the third angle is equal to or less than the third angle threshold or is a predetermined angle. This configuration allows the electromagnetic wave detection apparatus 100 to reduce the misalignment between the first detection axis, the second detection axis, and the third detection axis and also reduce the unevenness, corresponding to the distance from the third propagation axis, of the imaging state of electromagnetic waves on the detection surface of the third detector 220. Accordingly, the electromagnetic wave detection apparatus 100 can reduce the burden on the controller 14 for information processing to achieve a uniform imaging state.

In the electromagnetic wave detection apparatus 100 of the second embodiment, the first detector 17, the switch 180, the second detector 20, and the third detector 220 are disposed relative to the separation unit 16 so that the third angle differs from the first angle and the second angle by a predetermined angle difference or less. This configuration allows the electromagnetic wave detection apparatus 100 to reduce the misalignment of the optical axis of the third detector 220 relative to the first detector 17 the second detector 20 even further.

Although the present disclosure has been explained using the accompanying drawings and examples, it is to be noted that various changes and modifications will be apparent to those of ordinary skill in the art based on the present disclosure. Therefore, such changes and modifications are to be understood as included within the scope of the present disclosure.

For example, in the first embodiment and the second embodiment, the irradiator 12, the reflector 13, and the controller 14 form the information acquisition system 11 along with the electromagnetic wave detection apparatus 10, 100, but the electromagnetic wave detection apparatus 10, 100 may be configured to include at least one of these components.

In the first embodiment, the switch 18 can switch the propagation direction of the electromagnetic waves incident on the action surface as between two directions, but the switch 18 may instead be capable of switching the propagation direction among three or more directions. In the second embodiment, the switch 180 can switch the propagation direction of the electromagnetic waves incident on the action surface as among three directions, but the switch 180 may instead be capable of switching among four or more directions.

In the switch 18 of the first embodiment, the first state is a first reflecting state for reflecting the electromagnetic waves incident on the action surface as in the third direction d3, and the second state is a second reflecting state for reflecting these electromagnetic waves in the fourth direction d4. This configuration is not, however, limiting.

Figure 6:
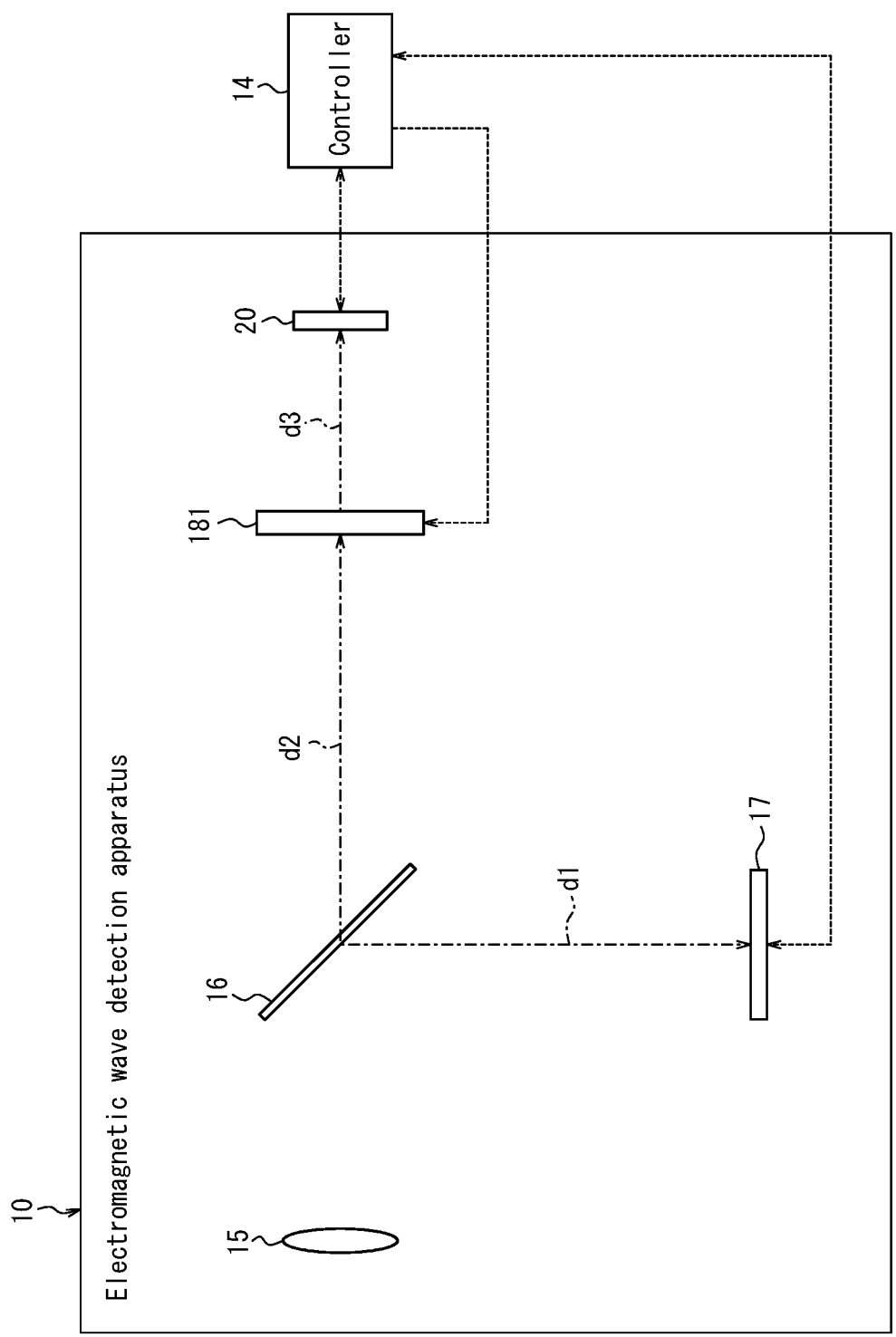
FIG. 6 is a configuration diagram schematically illustrating the configuration of a modification to the electromagnetic wave detection apparatus according to the first embodiment.

For example, as illustrated in FIG. 6, the first state may be a transmitting state for transmitting the electromagnetic waves incident on the action surface so that the electromagnetic waves propagate in the third direction d3. In greater detail, a switch 181 may include a shutter, on each switching element, that has a reflecting surface that reflects electromagnetic waves in the fourth direction. The switch 181 with this configuration can open and close the shutter of each switching element to switch each switching element between the transmitting state that is the first state and the reflecting state that is the second state.

An example of the switch 181 with such a configuration is a switch that includes a MEMS shutter including a plurality of openable shutters arranged in an array. Another example of the switch 181 is a switch that includes a liquid crystal shutter capable of switching, in accordance with liquid crystal orientation, between the reflecting state for reflecting electromagnetic waves and the transmitting state for transmitting electromagnetic waves. The switch 181 with this configuration can switch each switching element between the transmitting state as the first state and the reflecting state as the second state by switching the liquid crystal orientation of each switching element.

In the first embodiment, the information acquisition system 11 is configured so that the reflector 13 scans the beam of electromagnetic waves emitted by the irradiator 12, thereby causing the second detector 20 to works together with the reflector 13 and function as a scanning-type active sensor. In the second embodiment, the information acquisition system 11 is configured so that the reflector 13 scans the beam of electromagnetic waves emitted by the irradiator 12, thereby causing the second detector 20 and the third detector 220 to works together with the reflector 13 and function as a scanning-type active sensor. The information acquisition system 11 is not, however, limited to this configuration. For example, the information acquisition system 11 can achieve similar effects as in the first embodiment, without including the reflector 13, by causing electromagnetic waves to be emitted radially from the irradiator 12 and by acquiring information without scanning.

In the information acquisition system 11 of the first embodiment, the first detector 17 is a passive sensor, and the second detector 20 is an active sensor. The information acquisition system 11 is not, however, limited to this configuration. For example, similar effects as in the first embodiment can be achieved in the information acquisition system 11 when the first detector 17 and the second detector 20 are both active sensors or both passive sensors. In the information acquisition system 11 of the second embodiment, the first detector 17 is a passive sensor, and the second detector 20 and third detector 220 are active sensors. The information acquisition system 11 is not, however, limited to this configuration. For example, similar effects as in the second embodiment can be achieved in the information acquisition system 11 when the first detector 17, the second detector 20, and the third detector 220 are all active sensors or all passive sensors. Furthermore, similar effects as in the second embodiment can be achieved in the information acquisition system 11 when any two of the first detector 17, the second detector 20, and the third detector 220 are passive sensors.

While the disclosed system has a variety of modules and/or units for implementing particular functions, these modules and units have only been indicated schematically in order to briefly illustrate the functionality thereof. It should be noted that no particular hardware and/or software is necessarily indicated. In this sense, it suffices for the modules, units, and other constituent elements to be hardware and/or software implemented so as to substantially execute the particular functions described herein. The various functions of different constituent elements may be implemented by combining or separating hardware and/or software in any way, and the functions may each be used individually or in some combination. An input/output (I/O) device or user interface including, but not limited to, a keyboard, display, touchscreen, or pointing device may be connected to the system directly or via an I/O controller. In this way, the various subject matter disclosed herein may be embodied in a variety of forms, and all such embodiments are included in the scope of the subject matter in the present disclosure.

REFERENCE SIGNS LIST 10, 100 Electromagnetic wave detection apparatus
11 Information acquisition system
12 Irradiator
13 Reflector
14 Controller
15 Pre-stage optical system
16 Separation unit
17 First detector
18, 180, 181 Switch
19 First post-stage optical system
20 Second detector
210 Second post-stage optical system
220 Third detector
as Action surface
d1, d2, d3, d4 First direction, second direction, third direction, fourth direction
ob Object

The invention claimed is:
1. An electromagnetic wave detection apparatus comprising:
 a separation unit configured to separate electromagnetic waves incident on the separation unit so that the electromagnetic waves propagate in a first direction and a second direction;
 a first detector configured to detect the electromagnetic waves that propagate in the first direction;
 a switch comprising a plurality of switching elements capable of switching between a first state and a second state, the electromagnetic waves that propagate in the second direction being caused to propagate in a third direction in the first state and the electromagnetic waves that propagate in the second direction being caused to propagate in a fourth direction in the second state; and
 a second detector configured to detect the electromagnetic waves that propagate in the third direction,
 the switch switching each of the plurality of switching elements between the first state and the second state in accordance with an irradiation region with electromagnetic waves that are emitted by an irradiator.

2. The electromagnetic wave detection apparatus of claim 1, further comprising a third detector configured to detect the electromagnetic waves that propagate in the fourth direction.

3. The electromagnetic wave detection apparatus of claim 1, wherein the separation unit is configured to reflect a portion of the electromagnetic waves incident on the separation unit in the first direction and transmit another portion of the electromagnetic waves in the second direction.

4. The electromagnetic wave detection apparatus of claim 1, wherein the separation unit is configured to transmit a portion of the electromagnetic waves incident on the separation unit in the first direction and transmit another portion of the electromagnetic waves in the second direction.

5. The electromagnetic wave detection apparatus of claim 1, wherein the separation unit is configured to refract a portion of the electromagnetic waves incident on the separation unit in the first direction and refract another portion of the electromagnetic waves in the second direction.

6. The electromagnetic wave detection apparatus of claim 1, wherein the switch comprises a digital micro mirror device.

7. The electromagnetic wave detection apparatus of claim 1, wherein the switch is configured to switch each switching element between a transmitting state of transmitting the electromagnetic waves that propagate in the second direction towards the third direction and a reflecting state of reflecting the electromagnetic waves that propagate in the second direction towards the fourth direction.

8. The electromagnetic wave detection apparatus of claim 1, further comprising a controller configured to acquire information related to surroundings based on an electromagnetic wave detection result by the first detector and the second detector.

9. The electromagnetic wave detection apparatus of claim 8, wherein the controller is configured to acquire at least one of image information, distance information, and temperature information as the information related to the surroundings.

10. An information acquisition system comprising:
an electromagnetic wave detection apparatus comprising a separation unit configured to separate electromagnetic waves incident on the separation unit so that the electromagnetic waves propagate in a first direction and a second direction, a first detector configured to detect the electromagnetic waves that propagate in the first direction, a switch comprising a plurality of switching elements capable of switching between a first state and a second state, the electromagnetic waves that propagate in the second direction being caused to propagate in a third direction in the first state and the electromagnetic waves that propagate in the second direction being caused to propagate in a fourth direction in the second state, and a second detector configured to detect the electromagnetic waves that propagate in the third direction; and
a controller configured to acquire information related to surroundings of the electromagnetic wave detection apparatus based on an electromagnetic wave detection result by the first detector and the second detector,
the switch switching each of the plurality of switching elements between the first state and the second state in accordance with an irradiation region with electromagnetic waves that are emitted by an irradiator.

11. The electromagnetic wave detection apparatus of claim 1, wherein the switch is configured to switch a switching element that corresponds to the irradiation region to the first state and another switching element to the second state among the plurality of switching element.

12. The electromagnetic wave detection apparatus of claim 1, wherein the switch is configured to switch each of the plurality of switching elements between the first state and the second state in accordance with a target area to be detected in the irradiation region.

13. The electromagnetic wave detection apparatus of claim 1,
further comprising a changer configured to change the irradiation region;
wherein the switch is configured to switch each of the plurality of switching elements between the first state and the second state in accordance with a change of the irradiation region by the changer.

14. The electromagnetic wave detection apparatus of claim 1,
further comprising an image former configured to forms an image of electromagnetic waves that propagate in the second direction;
wherein the switch is provided at or near an image formation position of the image former.

15. The electromagnetic wave detection apparatus of claim 1,
wherein the first detector is an image sensor for generating an image information of an object captured with incident electromagnetic waves; and
wherein the second detector includes a device configure as a ranging sensor for measuring a distance to the object irradiated with the electromagnetic waves that are emitted by the irradiator.

16. The electromagnetic wave detection apparatus of claim 1, wherein the first detector is configured to detect visible light rays, and the second detector is configured to detect infrared rays.

17. The electromagnetic wave detection apparatus of claim 1,
further comprising an irradiation-direction-changer configured to change the irradiation region by changing an irradiation direction of electromagnetic waves emitted by the irradiator;
wherein the switch is configured to switch each of the plurality of switching elements between the first state and the second state in accordance with the irradiation region.

18. The electromagnetic wave detection apparatus of claim 1,
further comprising an image former configured to forms an image of electromagnetic waves that propagate in the second direction;
wherein the switch is configured to switch at least a part of a switching element, in an image formed region where the image former forms an image of incident electromagnetic waves from the irradiation region, to the first state and another switching element to the second state among the plurality of switching element.

19. The electromagnetic wave detection apparatus of claim 1,
wherein the first detector is disposed so that a first propagation axis is parallel to a first detection axis, the first propagation axis is a central axis of the electromagnetic waves that propagate from the separation unit in the first direction, and the first detection axis passes through a center of a detection surface where the first detector detects electromagnetic waves and is perpendicular to the detection surface; and
wherein the switch and the second detector are disposed so that a second propagation axis is parallel to a second detection axis, the second propagation axis is a central axis of the electromagnetic waves that propagate from the separation unit in the second direction and are switched in propagation direction to the third direction by the switch, and the second detection axis passes through a center of a detection surface where the second detector detects electromagnetic waves and is perpendicular to the detection surface.

20. The electromagnetic wave detection apparatus of claim 1,
wherein the first detector is disposed so that a first angle between a central axis of the electromagnetic waves that propagate from the separation unit in the first direction and a detection surface of the first detector is equal to or less than a first angle threshold or is a predetermined angle; and
wherein the switch and the second detector are disposed so that a second angle between a central axis of the electromagnetic waves that propagate from the separation unit in the second direction and are switched in propagation direction to the third direction by the switch and a detection surface of the second detector is equal to or less than a second angle threshold or is a predetermined angle.

\* \* \* \* \*